(12) United States Patent
Barton et al.

(10) Patent No.: US 6,203,648 B1
(45) Date of Patent: Mar. 20, 2001

(54) METHOD FOR MANUFACTURING PAINT ROLLER

(75) Inventors: William W. Barton; Bruce C. Polzin, both of Greendale; Kenneth L. Shehow, Milwaukee, all of WI (US); Jaime Alvarez Garcia, Barcelona (ES)

(73) Assignee: Newell Operating Company, Freeport, IL (US)

( * ) Notice: Subject to any disclaimer, the term of this patent is extended or adjusted under 35 U.S.C. 154(b) by 0 days.

(21) Appl. No.: 08/344,345

(22) Filed: Nov. 22, 1994

Related U.S. Application Data

(63) Continuation-in-part of application No. 08/155,316, filed on Nov. 22, 1993, now Pat. No. 5,397,414, which is a continuation-in-part of application No. 07/871,889, filed on Apr. 21, 1992, now Pat. No. 5,273,604, which is a continuation of application No. 07/489,398, filed on Mar. 6, 1990, now abandoned.

(51) Int. Cl.⁷ .............................. B32B 31/02; B32B 31/04
(52) U.S. Cl. .......................... 156/187; 156/188; 156/192; 156/195
(58) Field of Search ..................................... 156/184, 185, 156/187, 188, 190, 191, 192, 195, 430, 431, 432, 446

(56) References Cited

U.S. PATENT DOCUMENTS

| | | | |
|---|---|---|---|
| 2,647,300 | * 8/1953 | Thomas et al. | 156/188 X |
| 3,226,799 | * 1/1966 | Grodberg et al. | 156/188 X |
| 3,457,130 | * 7/1969 | Morrison | 156/190 |
| 4,197,348 | * 4/1980 | Townsend | 156/188 X |
| 4,514,245 | * 4/1985 | Chabrier | 156/187 X |
| 5,137,595 | * 8/1992 | Garcia | 156/187 X |
| 5,195,242 | * 3/1993 | Sekar | 156/187 X |

\* cited by examiner

Primary Examiner—Curtis Mayes
(74) Attorney, Agent, or Firm—Foley & Lardner

(57) ABSTRACT

The invention consists of bonding a strip of pile fabric to a plastic tube which is mounted over a mandrel, by an adhesive substance. The adhesive substance may take many forms, and heat derived from a multitude of heat sources, such as infra red, radio frequency, open flame, quartz, induction, ultrasonic or a plasma jet may be used to ensure a good bond between the plastic tube and the pile fabric.

12 Claims, 3 Drawing Sheets

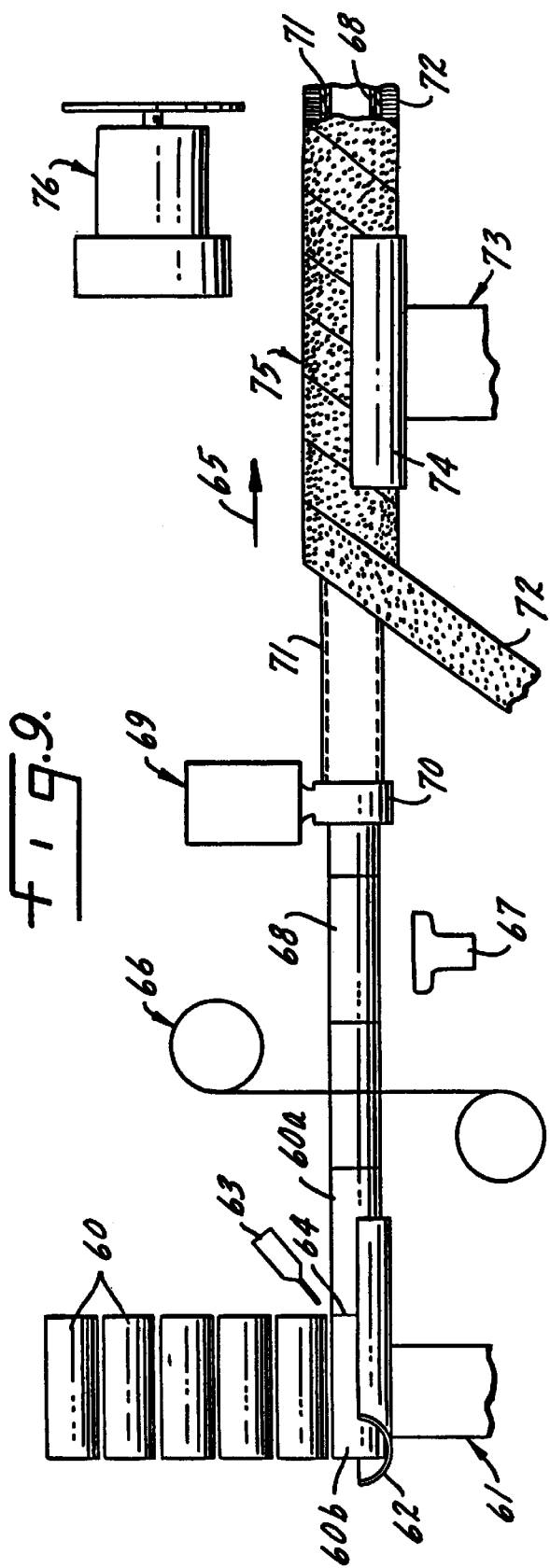

METHOD FOR MANUFACTURING PAINT ROLLER

This application is a continuation-in-part of U.S. patent application Ser. No. 08/155,316 filed Nov. 22, 1993, now U.S. Pat. No. 5,397,814, which in turn is a continuation-in-part of U.S. patent application Ser. No. 07/871,889, now U.S. Pat. No. 5,273,604, filed on Apr. 21, 1992, which in turn is a continuation of U.S. patent application Ser. No. 07/489,398, filed on Mar. 6, 1990, now abandoned, which claims the benefit of the filing date pursuant to 35 U.S.C. §119 of the Spanish Application Serial No. 8900821, filed on Mar. 7, 1989.

FIELD OF THE INVENTION

The present invention relates generally to the manufacture of composite thermoplastic products and more specifically to an improved method of manufacturing paint rollers and the product produced thereby. More particularly, the present invention relates to methods for conditioning the surface of a thermoplastic tube to receive a variety of adhesives suitable for adhering a thermoplastic compatible fabric strip to the thermoplastic tube which, for purposes of illustration, will be a thermoplastic paint roller core.

BACKGROUND OF THE INVENTION

Currently in the manufacture of paint rollers, strips of pile fabric are used which are wound around a plastic or cardboard tube or core. More specifically, among the devices currently employed is a type of machine illustrated in Spanish Utility Model No. 293.980, which includes a rotating cylinder over which the cardboard or plastic tube is mounted, and onto which a strip of pile fabric is applied through a guide oriented obliquely and situated on and carried by a carriage which is mounted in fixed fashion over a sliding apparatus. The bonding of the tube and strip of pile fabric is accomplished either by the application of adhesive material in the case of a cardboard tube or, in the case of a plastic tube, gas flame heating by which gas burners heat the tube to bond it to the strip of pile fabric, thereby forming a single body.

In the first case, i.e., where conventional adhesive is used as the means of bonding between the cardboard tube and strip of pile fabric, the manufacture of paint rollers presents significant problems, all resulting from the difficulty of applying the adhesive uniformly, plus the fact that very specific adhesives must be used to produce the bond between the cardboard tube and the strip of pile fabric so that, when the rollers are used, these adhesives do not separate due to the solvents contained in the paint and in the fluids used to clean the roller.

These problems considerably increase the cost of manufacturing paint rollers because of the cost of the adhesives and the time needed for the adhesives to harden.

The second system mentioned above, though a significant advance in the art over what had been earlier used, does present certain problems, all resulting from the increased safety costs required by installations that use gas as a fuel source for the gas flame heating. Further, the heating of the plastic tube can produce undesirable products of combustion and high noise, both effects being potentially harmful for the operators and expensive to eliminate; all of this therefore has the result of raising the cost of the final product.

SUMMARY OF THE INVENTION

The object of the present invention is a procedure for manufacturing paint rollers and the product produced thereby, of the type in which a strip of pile fabric is wound helically over a plastic base structure, such as a tube or core, with a thermoplastic adhesive substance interposed therebetween, with the result that the strip of pile fabric and the plastic base structure form a single, integral composite end product.

Specifically, an intermediate thermoplastic adhesive substance is applied onto a plastic tube in the area adjacent to the area of the winding of a fabric strip on the tube, the adhesive substance being heated. If the adhesive substance is molten it may be applied through a nozzle connected to a reservoir where the thermoplastic adhesive is heated, which nozzle is mounted on a carriage on which the pile fabric strip applicator is also located. Suitable adhesives include polypropylene, polyethylene, a mixture of polypropylene and polyethylene, any of a variety of polyamides, polyolefin based compounds, polyester based compounds, polyurethane based compounds, polyamide "hot melt" adhesives sold under the designations HB Fuller Hot Melt 6542-PEL and HL2021, Hot Melt 2167PL and other suitable adhesives compatible with a thermoplastic tube, such as a polypropylene tube, a polyethylene tube, a nylon tube, or a combination of polypropylene and polyethylene, and resistant to the anticipated solvents found in the paint, stain, shellac or varnish and the solvents used to clean the roller. The anticipated solvents include turpentine, mineral spirits, aliphatic compounds, ketones or aromatics in petroleum based solvents including naphtha, chlorinated hydrocarbons, alcohol based solvents, acetone, toluene and water including soapy water and ammoniated water.

Another object of the present invention is the provision of a paint roller which is structurally integral as a result of the bonding of the thermoplastic adhesive with the strip of the pile fabric and the plastic tube.

BRIEF DESCRIPTION OF THE DRAWINGS

The invention is illustrated more or less diagrammatically in the accompanying figures wherein:

FIG. 9 is a side view, partly in section, of a further embodiment of the invention in which, if desired, a supporting mandrel may be dispensed with.

DETAILED DESCRIPTION OF THE INVENTION

Figure 1:
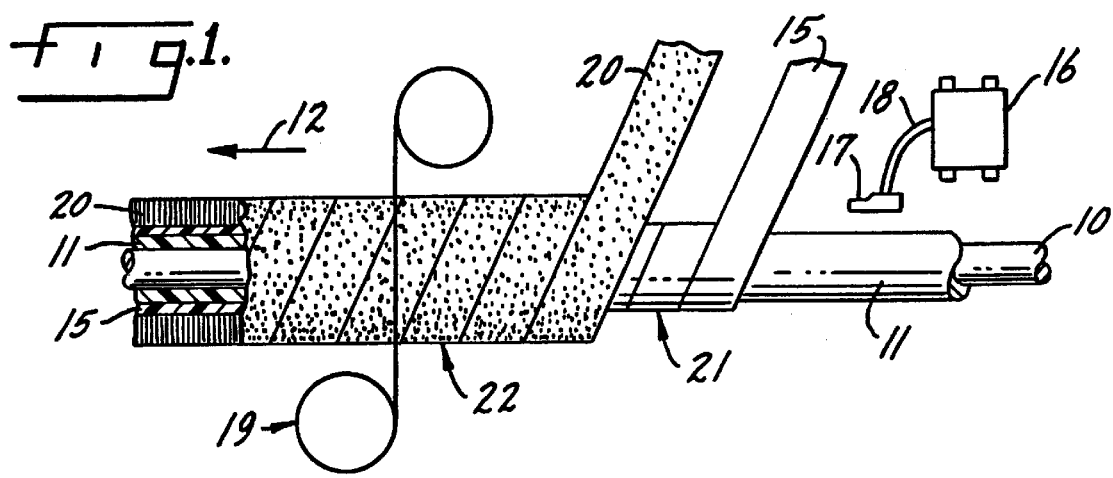
FIG. 1 is a side view, partially in section and with standard components indicated diagrammatically, of a method of producing a plastic paint roller.

Referring first to the embodiment of FIG. 1 a supporting mandrel is indicated at 10, the mandrel being supported in suitable bearings, not shown. A self sustaining plastic tube, which forms the structural core of the final product, here a paint roller, is indicated at 11, the core being driven in the direction of arrow 12 by any suitable means, such as a conventional Ford drive, indicated diagrammatically at 19, located near the left end of the processing sequence shown in FIG. 1. The tube may be composed of any suitable thermoplastic material such as polypropylene, polyethylene, polyamides, polyolefins or mixtures thereof. For paint rollers polypropylene is the industry's material of choice. The core may be either cold or heated as it enters the processing steps to be subsequently described hereafter. If heated to the point where cooling to room temperature will cause an internal dimensional contraction, the mandrel 10 may be slightly tapered in a leftward direction to accommodate the shrinkage. If possible the core should be heated so as to decrease the additional heat energy which must be supplied to complete the processing.

An adhesive substance, here a thermoplastic material in strip form which is compatible in a bond and strength sense with the core and fabric which will later be added, is indicated at 15. The adhesive substance, which may for example be polypropylene or any one of the other substances above mentioned in conjunction with the core, or slight modification thereof, is fed from a suitable source of supply and is wrapped around the core in such fashion that the laps butt snugly against one another.

Preferably, though not essentially, the adhesive substance is at an elevated temperature to facilitate bonding to core 11. In this instance a process is illustrated in which supplemental heat energy is added to the core to ensure good bonding between the core and the adhesive substance. The supplemental heat energy may be supplied by any suitable means such as flame burners, electrical resistance heating, radio frequency, infra red, quartz, induction, ultrasonic or plasma jet electrical discharge means. Here the latter has been illustrated, said plasma jet system consisting of a power unit, indicated generally at 16, and a discharge head, indicated generally at 17, the discharge head being connected to the power unit by leads 18. It should be understood that the ultimate objective of insuring a good bond between the adhesive substance and the core is a matter of proper selection of the above described heating forms. Thus, if the core 11 has a high heat content, as it would if it were freshly extruded at a location just to the right of the right end of FIG. 1, and the single layer of the adhesive substance 15 was also either freshly extruded, or freshly heated, the jet plasma or alternate heating system may be omitted. If on the other hand the core 11 is cold, that is, at room temperature at the start of the process, then the use of the plasma jet or alternate heating system will probably be essential. It may be most convenient to use the adhesive substance 15 in coil form at room temperature. In this event the adhesive substance 15 may have its outer surface, that is, the surface which will subsequently come in contact with the pile fabric, heated, or, if desired, just the inner surface, or both, heated. Any one of the foregoing heating systems may be used, the selection of which one dependent on operating parameters pertaining to each installation, including cost. In essence, the heating sources used and the extent to which they are used, can be tailored to the conditions which are present in each factory, and those basic operating conditions—space, power availability, economies of production inherent in a given location, etc.—will vary from factory to factory.

A pile fabric in strip form is indicated at 20, the fabric being wrapped about the core-adhesive substance structure, indicated generally at 21, in such fashion that the individual wraps butt tightly against one another.

Again, the primary objective is to form a tight bond between the back side of the fabric and the structure 21. Although heating the back side of the fabric 20 may be feasible in some cases, this is not usually preferred due to possible over heating and consequent degradation of the fabric pile. If the surface temperature of structure 21 is hot enough and, preferably, the surface of the wrapped adhesive soft enough to be flowable into the interstices on the back side of the fabric, no additional heat may be required and a good bond formed merely by the pressure contact between the fabric and structure 21. If the surface temperature of structure 21 is not hot enough, heat from a supplemental heat source, which may be any one of the above described means, i.e., flame burners, electrical resistance heating, radio frequency, infra red, quartz, ultrasonic, or plasma jet electrical discharge, may be added to the surface of structure, 21 prior to application of fabric 20. A press shoe or press roller may be used, if required, to ensure good pressure contact between the fabric and structure 21.

Figure 7:
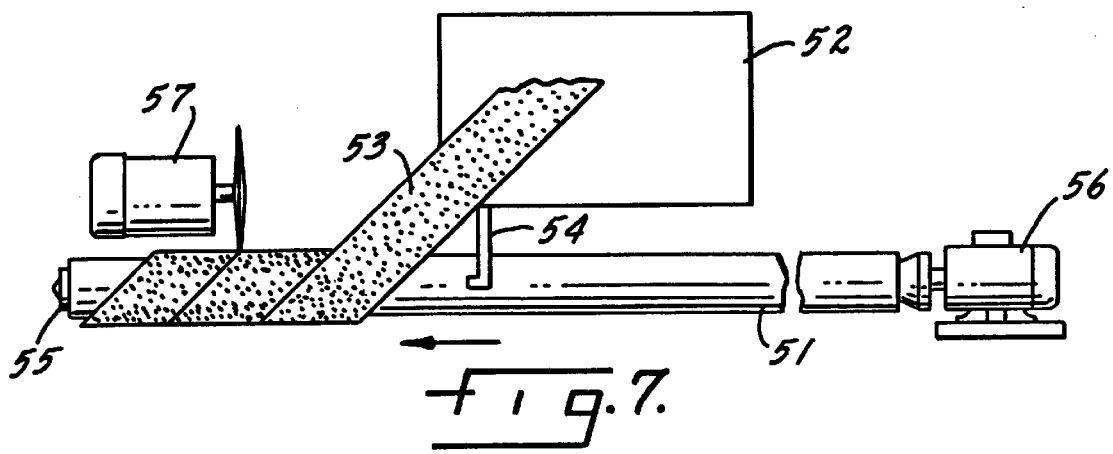
FIG. 7 is a plan view of an alternative embodiment in which a plastic tube is mounted on a rotating roller which is moved longitudinally by means of a drive unit, the strip of helically wound pile fabric and the applicator of the thermoplastic adhesive in a molten state being located on a fixed carriage.

If core 11 is part of a continuous process, as it would be if the core is extruded upstream from the processing steps illustrated in FIG. 1, a conventional traveling cut-off mechanism may be used to separate the continuous formed structure 22 into discrete roller lengths suitable, if need be, for further processing such as edge trimming; see FIG. 7. It should also be noted that if mandrel 10 is stationary and core 11 is to be rotated, it may be more convenient to use a drive system, such as Ford drive 19, in contact with the core 11 at a location just to the right, i.e., upstream, of the discharge head 17. In this arrangement, any possible stretching of the core or other components which might occur from the illustrated placement of Ford drive 19 would be eliminated.

If, on the other hand core 11 is a discrete length as it would be if pre-made and stored until wrapping is required, a cutting mechanism can be omitted or performed sequentially, but separately, from the illustrated forming process.

Figure 2:
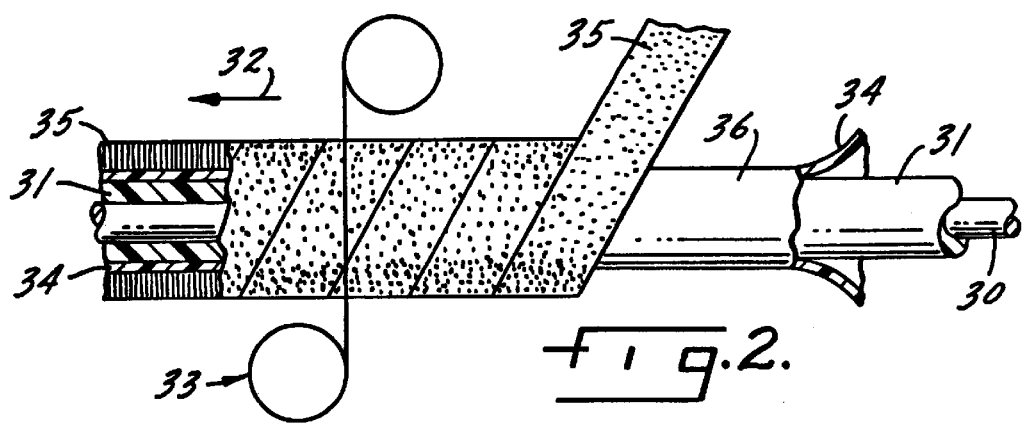
FIG. 2 is a side view, partly in section of an alternative method of producing a paint roller.

An alternative form of the invention is illustrated in FIG. 2 in which the adhesive substance is formed as a separate envelope, such as by extrusion about the core.

A mandrel is illustrated at 30 and a core at 31. The mandrel may rotate, carrying the core 31 with it in the direction of the arrow 32. Alternatively, the mandrel may be stationary and the core, in effect, pulled in the direction of arrow 32 by a drive mechanism, such as a conventional Ford drive system indicated generally at 33 and located near the end of the processing sequence and after fabric has been applied.

An adhesive substance, in this instance an envelope which has, preferably, though not necessarily, been extruded at the right end of the processing sequence, is indicated at 34. The displacement of the adhesive substance envelope 34 away from the core 31 has been somewhat exaggerated to indicate the recent formation thereof and its capacity for shrinkage about the core 11 to form a good bond with the core. It should be understood that the envelope 34 may be quite structurally sound with only its interior surface, at least, heated, or it may be in a mushy or barely self supporting state depending on its heat content. Preferably the surface of core 31 is heated, as it would be for example if it was freshly extruded, or heat may be applied to a room temperature or insufficiently hot surface by flame burners, electrical resistance heating, radio frequency, infra red, quartz, induction, ultrasonic, the plasma jet system of FIG. 1, or any other suitable form of heating or surface preparation including chemical priming of the type disclosed in the May, 1988, issue of the *TAPPI Journal*, pp 101–104, the disclosure of which is incorporated herein by reference.

After adhesion of the envelope 34, whether in structurally solid and strong or in near molten condition, to core 31, a base structure 36 is formed. Immediately after formation of base structure 36, fabric 35 in strip form is wrapped therearound in such fashion that the edges of adjacent wraps abut against one another to form a peripherally continuous fabric surface. Again a press roller or press shoe may be employed to apply pressure to the fabric-base structure junction. As mentioned above, the fabric backing may be heated, though this may not be expedient in all environments. Again, no supplementary heat may be needed to ensure a good bond between base structure 36 and fabric 35 but it will usually be advantageous to apply supplemental heat to the exterior of base structure 36 just upstream of the junction of fabric 35 with the base structure to ensure a good bond. If envelope 34 was near molten or very hot and tacky when it came in contact with core 31, only a modest amount of supplemental heat may be needed to ensure a good bond. Again, the operating parameters will vary from installation to installation and the processing sequence disclosed herein will have to be adjusted accordingly. If supplemental heat is required, flame burners, electrical resistance heating, radio frequency, infra red, quartz, induction, ultrasonic or jet plasma heating may be employed, with or without chemical priming, to ensure the primary objective of a good bond.

Figure 3:
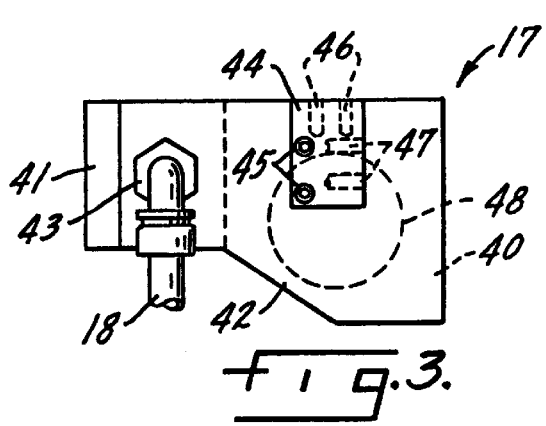
FIG. 3 is a side view of a plasma jet discharge head usable in the embodiment of FIG. 1.
Figure 4:
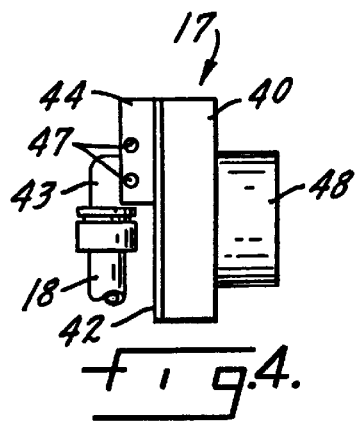
FIG. 4 is a right end view of FIG. 3.
Figure 5:
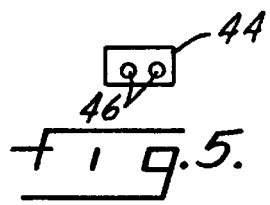
FIG. 5 is a top view of the current input box for the discharge head which connects the discharge head to the power unit.

The plasma jet heating system illustrated diagrammatically in FIG. 1 is illustrated in greater detail in FIGS. 3–5. The discharge head 17 includes a head 40 having a discharge end 41. A mounting plate is indicated at 42, the mounting plate having a connector 43 which receives the lead 18 which extends from the power unit 16. A junction box is indicated at 44, said junction box being secured to mounting plate 42 by bolts 45, and it has two pairs of sockets 46, 47 for auxiliary uses. A blower is indicated at 48. It will be understood that said plasma jet system may be of conventional construction such as those available from Corotec Corporation, Collinsville, Conn. as model nos. PJ-11, -12, -21, -22, all 120V and 2, 4 or 8 amps at 60 Hz. PJ-11 has an output/discharge of, for example, 10 KV, 25 mA, and 60 Hz. The power unit converts incoming single phase 120 volt power to the high voltage necessary for plasma discharge. The discharge head utilizes a high performance brushless DC blower which moves air across the electrodes at a rate which is controlled and monitored by the power unit.

Figure 6:
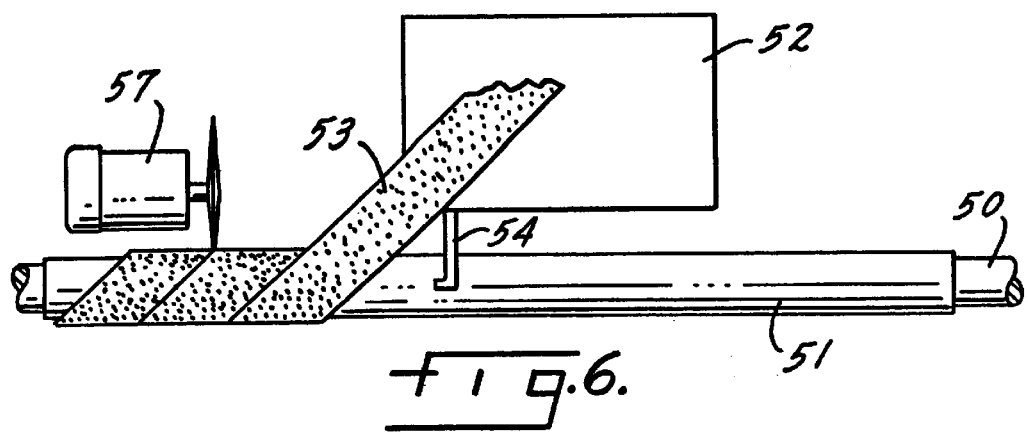
FIG. 6 is a plan view of an alternative embodiment in which a plastic tube is mounted over a rotating roller and the strip of pile fabric is wound helically and further including a movable carriage on which are situated the applicator of the pile fabric strip and the nozzle for applying thermoplastic adhesive in a molten state.

FIG. 6 illustrates a system having a rotating mandrel 50 on which the plastic tube 51 is mounted. A carriage is indicated at 52 which, in FIG. 6, is movable parallel to the longitudinal axis of the rotating mandrel. The carriage 52 includes a feed mechanism not shown, for pile fabric strip 53 which is helically wound around the plastic tube 51.

Initially a pre-formed plastic tube 51 is mounted over the rotating mandrel 50 and thereafter the strip of pile fabric 53 is wound helically over the plastic tube 51 through the applicator located on the movable carriage 52.

Figure 8:
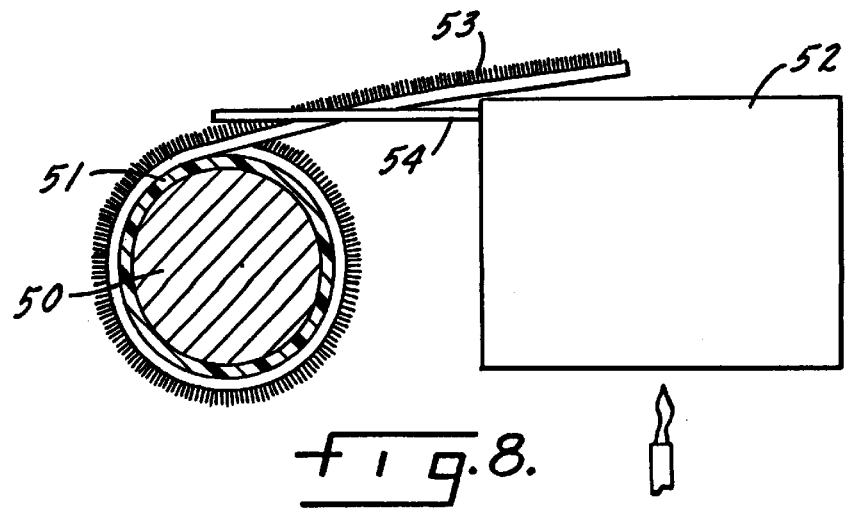
FIG. 8 is a section view of either of FIG. 6 or 7 showing a section of the roller already constructed, wherein the strip of pile fabric, the thermoplastic adhesive and the plastic tube form a single body.

The fundamental feature of the procedure illustrated in FIGS. 6–8 for the manufacture of paint rollers consists of applying a thermoplastic adhesive in a molten state onto the area of the plastic tube 51 where the strip 53 will be closely wound. It will be understood that the specific thermoplastic adhesive material applied to the junction region between the tube and fabric is not critical to the invention. However, it must be compatible with the plastic tube selected, the pile fabric and the solvents contained in the paint, stain, varnish or shellac as well as the solvents used to clean the roller if the roller is the reusable type. The thermoplastic adhesive is applied by the outlet mouth of a nozzle 54 mounted over the movable carriage 52, which nozzle 54 is connected to a reservoir where the thermoplastic adhesive is heated.

In the embodiment of FIG. 7, the plastic tube 51 is mounted over a rotating roller 55. The plastic tube may be moved longitudinally by a drive unit 56, while the carriage 52 and the rotating roller 55 remain axially fixed.

The systems of FIGS. 6 and 7 each include a cutter 57 which produces the roller units in a condition ready for the subsequent assembly of the handle, axis and cap. In the embodiment of FIG. 6, the cutter 57 does not move horizontally when cutting. In the embodiment of FIG. 7 it will be understood that the cutter 57 will be arranged to move in synchronism with the horizontal movement of the tube 51 when cutting.

The embodiment of FIG. 9 illustrates a system in which a mandrel is not an essential component, though it may be used as a precautionary measure. A plurality of pre-made cores are indicated at 60 and are fed to the system by a suitable race and delivery system, not shown. A support for the continuous core forming station is indicated generally at 61, the support including a trough member 62 with which each core 60 makes initial contact. A welder is indicated at 63 which functions to join adjacent cold tubes 60*a* and 60*b* together by a butt weld at joint 64. The welder may be a sonic welder, a flame melt welder, or any other type capable of forming a solid junction. The welder is moved to the right during the welding process since the core and its subsequent accretions move continually to the right as indicated by arrow 65.

A drive system, here a conventional Ford drive, is indicated generally at 66.

Since the cores 60 will either be cold, i.e., at room temperature, or only at a slightly elevated temperature, a preheater or surface treater may be required. Here such a preheater or surface treater is indicated at 67. It may be any of the above described types since its purpose is to condition the surface of the now unitary core 68 to bond tightly to an adhesive substance. A corona discharge or plasma jet system may be especially efficient.

An adhesive substance dispenser is indicated generally at 69. The dispenser dispenses a suitable adhesive substance, such as liquified polypropylene, polyethylene or other bond forming substances compatible with the unitary core 68 and the later applied pile fabric. In this instance the adhesive substance is dispensed through a ring type of extruder, indicated at 70, which forms a layer of the adhesive substance, indicated at 71, on the unitary core 68.

A strip of pile fabric is indicated at 72, the fabric being joined to the coated core while the layer 71 of the adhesive substance is still hot and tacky enough to form a tight bond with the backing of the fabric. It will be understood that supplemental heat may be applied downstream from the extruder 70 and upstream from the core-fabric junction if, without it, the outer surface of the layer 71 has cooled too low to form a good bond.

Another support is indicated generally at 73, this support including a trough 74 which is slightly larger than trough 62 since trough 74 must accommodate the larger diameter composite product 75 which includes the layer of adhesive substance 71 and pile fabric 72. A traveling cut-off is indicated at 74.

All of the above described systems produce a composite paint roller due to the bonding produced between the plastic tube and the strip of pile fabric, together with the interposition of a compatible adhesive substance which is capable of forming a strong bond. The exact temperatures used in the processes will of course vary slightly from material to material and other factors unique to a specific operation as will be readily apparent to one skilled in the art.

The preferred adhesive substances include polypropylene, polyethylene, a mixture of polypropylene and polyethylene, one preferred mixture having a polypropylene:polyethylene ratio of about 80:20, polyamide or a mixture of polyamides, polyolefin based compounds, polyester based compounds, polyurethane based compounds, polyamide "hot melt" adhesives sold under the designations HB Fuller 6542-PEL and HL2021 and Hot Melt 2167PL as well as other suitable adhesives compatible with a plastic tube which may be fabricated from polypropylene. Alternative materials for fabricating the core include other polymeric materials including polyethylene, a mixture of polyethylene and polypropylene, polyethylene with added talc, polyester and other plastics. The adhesive substance must also be compatible with the plastic tube and the pile fabric, and be resistant to the anticipated solvents used in connection with painting. These solvents include water, water with ammonia, soapy water, mineral spirits, turpentine, aromatic compounds, aliphatic compounds, alcohols, ketones, acetone, toluene, chlorinated hydrocarbons and other solvents foreseeably used with paint, including both water and oil based paints, shellac and varnish.

Although several embodiments of the invention have been illustrated and described, it will at once be apparent to those skilled in the art that modifications and improvements may be made within the scope of the invention. Accordingly it is intended that the scope of the invention not be limited by the foregoing exemplary description, but only by the hereafter appended claims.

We claim:

1. In a method of producing a structurally integrated paint roller, the method comprising the steps of:
   providing a plastic paint roller core,
   rotating the paint roller core,
   providing an adhesive substance in strip form which is compatible with both the paint roller core and a fabric backing,
   said strip form adhesive substance being composed solely of said adhesive substance,
   heating the strip form adhesive substance to a temperature at which it will bond to the paint roller core,
   presenting a fabric strip to the paint roller core, the fabric strip having a fabric backing,
   making a single-application of the strip form adhesive substance to the rotating paint roller core immediately prior to the placement of the fabric strip on the paint roller core in an amount sufficient to securely bond the fabric strip to the paint roller core so as to yield a structurally integral product, and
   wrapping the fabric strip while the adhesive substance is in a bondable condition about the paint roller core while the fabric strip and paint roller core are rotating with respect to each other.

2. The method of claim 1,
   wherein the adhesive substance is selected from the group consisting of: polypropylene, polyethylene, a mixture of polypropylene and polyethylene in a ratio of about 80:20, polyamide, polyolefin based compounds, polyester based compounds, nylon, and polyurethane based compounds.

3. The method of claim 1,
   wherein the plastic for fabricating the paint roller core is selected from the following:
      polypropylene, polyethylene, polyester, nylon and a mixture of polyethylene and polypropylene.

4. The method of claim 3 further characterized in that the adhesive substance is in near molten condition at the time it is applied to the paint roller core.

5. The method of claim 4 further including the step of heating the core by plasma jet prior to application of the strip form adhesive.

6. The method of claim 3 further characterized in that the adhesive substance is in a heated yet structurally self sustaining form at the time it is applied to the paint roller core.

7. In a method of producing a structurally integrated paint roller, the method comprising:
   providing a thermoplastic paint roller core,
   rotating the paint roller core,
   providing an adhesive substance which is compatible with both the paint roller core and a fabric backing,
   said adhesive substance being in a hot, extruded conditions in the form of an envelope which envelopes the paint roller core,
   said envelope form adhesive substance being composed solely of said adhesive substance,
   presenting a thermoplastic fabric strip to the paint roller core, the fabric having a fabric backing,
   applying the hot, extruded envelope adhesive substance to the rotating paint roller core immediately prior to the placement of the fabric strip on the paint roller core in an amount sufficient to securely bond the fabric strip to the paint roller core so as to yield a structurally integral product, and
   wrapping the fabric while the adhesive substance is in a bondable condition about the paint roller core while the fabric and the paint roller core are rotating with respect to each other.

8. The method of claim 7 further characterized in that the adhesive substance is in near molten condition at the time it is applied to the paint roller core or backing of fabric.

9. The method of claim 7 further characterized in that the adhesive substance is in a heated yet structurally self sustaining form at the time it is applied to the paint roller core or backing of fabric.

10. The method of claim 7 further including the step of heating the core-adhesive substance structure prior to application of the fabric.

11. The method of claim 7,
    wherein the adhesive is selected from the group consisting of: polypropylene, polyethylene, a mixture of polypropylene and polyethylene having a polypropylene:polyethylene ratio of about 80:20, polyamide, polyolefin based compounds, polyester based compounds, nylon and polyurethane based compounds.

12. The method of claim 7,
    wherein the plastic for fabricating the paint roller cored is selected from the following:
       polypropylene, polyethylene, polyester, nylon, a mixture of polyethylene and polypropylene or polyolefin.

* * * * *